(12) United States Patent
Hiramoto et al.

(10) Patent No.: US 7,237,991 B2
(45) Date of Patent: Jul. 3, 2007

(54) MACHINE TOOL

(75) Inventors: Kazuyuki Hiramoto, Yamatokoriyama (JP); Akihiro Mochizuki, Yamatokoriyama (JP); Shunsuke Nakazawa, Yamatokoriyama (JP); Satoshi Matsui, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 540 days.

(21) Appl. No.: 10/891,495

(22) Filed: Jul. 15, 2004

(65) Prior Publication Data
US 2005/0031429 A1 Feb. 10, 2005

(30) Foreign Application Priority Data
Jul. 15, 2003 (JP) ............... 2003-197389

(51) Int. Cl.
*B23C 1/06* (2006.01)
(52) U.S. Cl. ................. 409/239; 409/202; 409/185
(58) Field of Classification Search ................. 409/202, 409/185, 238–239, 235; 408/234, 102; *B23C 1/06*
See application file for complete search history.

(56) References Cited
U.S. PATENT DOCUMENTS

| | | | | |
|---|---|---|---|---|
| 2,564,180 A | * | 8/1951 | Turrettini | 74/89.38 |
| 2,892,388 A | * | 6/1959 | Daugherty | 409/202 |
| 2,901,947 A | * | 9/1959 | Engel et al. | 409/238 |
| 3,008,381 A | * | 11/1961 | Jones | 409/237 |
| 3,027,813 A | * | 4/1962 | Seborg | 409/238 |
| 3,129,641 A | * | 4/1964 | Walter | 409/238 |
| 3,233,521 A | * | 2/1966 | Ford | 409/238 |
| 3,264,905 A | * | 8/1966 | Erikson | 408/234 |
| 3,274,891 A | * | 9/1966 | Rollat | 409/238 |
| 3,564,970 A | * | 2/1971 | Larsen | 409/185 |
| 3,704,649 A | * | 12/1972 | Von Den Hoff et al. | 409/193 |
| 3,730,051 A | * | 5/1973 | Hatzig | 409/238 |
| 3,761,194 A | * | 9/1973 | Wagner | 408/234 |
| 5,375,952 A | * | 12/1994 | Line | 409/202 |
| 2006/0008335 A1 | * | 1/2006 | Furuhashi et al. | 409/202 |

FOREIGN PATENT DOCUMENTS

| | | | |
|---|---|---|---|
| JP | 58028443 A | * | 2/1983 |
| JP | 63-62636 A | | 3/1988 |
| SU | 975314 A | * | 11/1982 |

* cited by examiner

*Primary Examiner*—Daniel W. Howell
(74) *Attorney, Agent, or Firm*—Smith Patent Office

(57) ABSTRACT

The present invention provides a machine tool capable of reducing residual vibration occurring at the location time, thereby achieving responsiveness to a recent demand for higher acceleration/deceleration speed. The machine tool is configured such that a column 3 is fixed on a bed 2, a spindle head 6 for supporting a spindle 7 is disposed on a front face 3b' of the column 3 to be movable in a Z-axis direction, and a pair of right and left Z-axis ball screws (spindle drive shafts) 22 for driving the vicinity of the gravity center of the spindle head 6 is disposed on the front face 3b' of the column 3 to be symmetrical to each other with respect to a plane that includes an axis C of the spindle head 6 and is parallel to a Y axis, thereby driving the vicinity of the gravity center of the spindle head 6.

5 Claims, 6 Drawing Sheets

FRONT OF MACHINE

MACHINE TOOL

BACKGROUND OF THE INVENTION

1. Field of the Invention

The present invention relates to a machine tool that machines a workpiece while moving a vertically set spindle and the workpiece relatively to each other in X-axis, Y-axis, and Z-axis directions.

2. Discussion of the Related Art

For example, a vertical machining center is generally structured, as shown in FIG. 5, to include: a column 61 fixedly disposed on a back end of a fixed bed 60 when seen from a front side of the machine; a saddle 62, for placing a workpiece W thereon, disposed on a front part of the fixed bed 60 to be movable in a Y-axis (forward and backward) direction; a table 63 disposed on the saddle 62 to be movable in an X-axis (right and left) direction; and a spindle head 65, with a spindle 64 attached thereto, disposed on a front face of the column 61 to be movable in a Z-axis (vertical) direction (see, for example, Japanese Patent Application Laid-open No. Sho 63-62636).

A driving system of a machining center of this type is generally structured such that, for example, as shown in FIG. 6 and FIG. 7, the spindle head 65 is movably supported by two guide rails 67, 67 and is driven by one ball screw 68 disposed between these guide rails 67. Note that 69 denotes a nut fitted to the ball screw 68, and 70 denotes a drive motor.

SUMMARY OF THE INVENTION

As the acceleration/deceleration speed at the time of the Z-axis direction feed of the spindle becomes higher and required locating accuracy becomes higher, however, the conventional driving system described above has come to have limited responsiveness to driving-transmission-output system, which poses a concern that it may not be able to respond to the recent requirement for still higher acceleration/deceleration speed. Specifically, residual vibration may possibly occur due to a bending moment as shown by the arrow in FIG. 7 when the spindle head is located, and improvement in this respect is demanded.

In view of the above-described conventional circumstances, it is an object of the present invention to provide a machine tool that is capable of responding to the demand for higher acceleration/deceleration speed by reducing residual vibration occurring at the locating time.

In a first invention, a machine tool includes: a bed; a saddle disposed on the bed to be movable in a forward and backward (Y-axis) direction in a front view of the machine tool; a table disposed on the saddle to be movable in a right and left (X-axis) direction; a column fixed on the bed; a spindle head disposed on a front face of the column to support a spindle and movable in a vertical (Z-axis) direction; a pair of right and left spindle drive shafts, for moving the spindle head, disposed on a front face of the column to be substantially symmetrical to each other with respect to a plane that includes an axis of the spindle head and is parallel to the Y-axis, thereby driving a vicinity of a gravity center of the spindle head.

In this invention, the pair of right and left spindle drive shafts for driving the spindle head are disposed to be substantially symmetrical to each other with respect to the plane that includes the axis of the spindle head and is parallel to the Y axis, thereby driving the vicinity of the gravity center of the spindle head. Therefore, an imaginary driving position by the right and left spindle drive shafts can substantially match the gravity center of the spindle head to allow gravity center driving of the spindle head. This can reduce the occurrence of residual vibration that is caused by a bending moment when the spindle head is located. As a result, the aforesaid responsiveness to driving-transmission-output system can be enhanced, so that it is possible to respond to the recent demand for still higher acceleration/deceleration speed.

In a preferable embodiment of the first invention, the column has a shape of a gate that is bridged over a travel range of the table and has right and left legs and a beam connecting tops of the right and left legs, and a straight line connecting the axis of the spindle head and axes of the right and left spindle drive shafts is parallel to the X axis in a plane view.

In the above-described embodiment, the column has the shape of the gate bridged over the travel range of the table, and the spindle head and the right and left spindle drive shafts are arranged on the front face of the beam of the column to be aligned along the straight line parallel to the X-axis, so that the imaginary driving position of the right and left spindle drive shafts can match the gravity center of the spindle head. This can further enhance responsiveness to the demand for higher acceleration/deceleration speed.

In another preferable embodiment of the first invention, the beam of the column is displaced from the right and left legs toward a back face side of the machine tool, and the axis of the spindle head coincides with the legs in a side view of the machine tool.

In the above-described embodiment, the beam of the column is displaced from the right and left legs toward the back face side of the machine tool, and the axis of the spindle head coincides with the legs, so that it is possible to eliminate the overhang of the spindle head from the column. In accordance therewith, support stiffness of the spindle head can be increased, which realizes responsiveness to higher acceleration/deceleration speed.

In still another preferable embodiment of the first invention, the beam is positioned at a substantially center portion of the bed in terms of the Y-axis direction.

In the above-described embodiment, the beam is positioned at the substantially center portion of the bed in terms of the Y-axis direction, so that it is possible to position the spindle head at the center portion of the bed while eliminating the overhang of the spindle head. This can expand a machinable area.

BRIEF DESCRIPTION OF THE DRAWINGS

The structure, operation, and effect of the present invention will be detailed in an embodiment based on the following attached drawings.

DETAILED DESCRIPTION OF THE PREFERRED EMBODIMENTS

Hereinafter, an embodiment of the present invention will be described based on the attached drawings.

Figure 1:
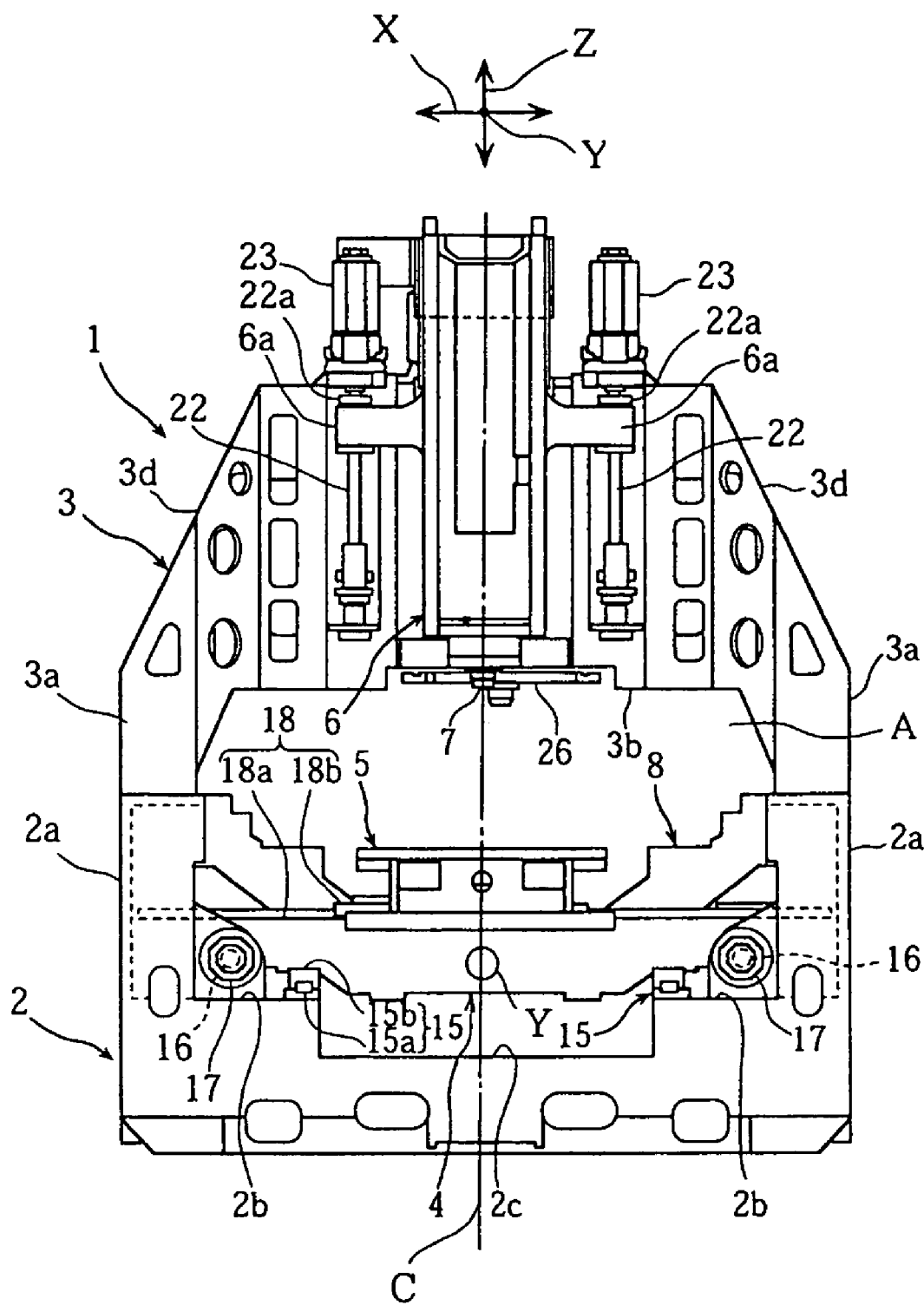
FIG. 1 is a front view to explain a vertical machining center according to an embodiment of the present invention.
Figure 2:
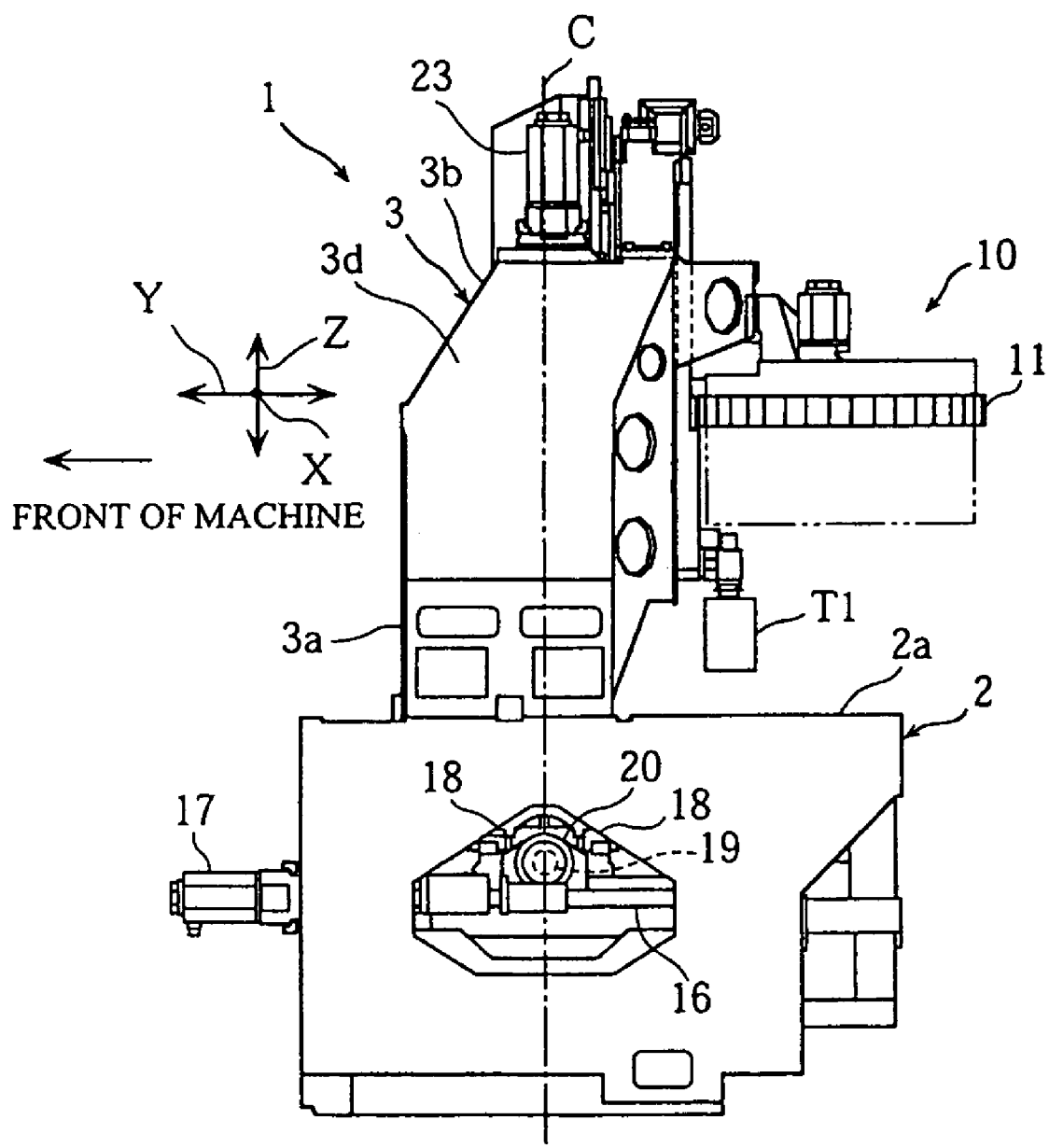
FIG. 2 is a right side view of the vertical machining center.
Figure 3:
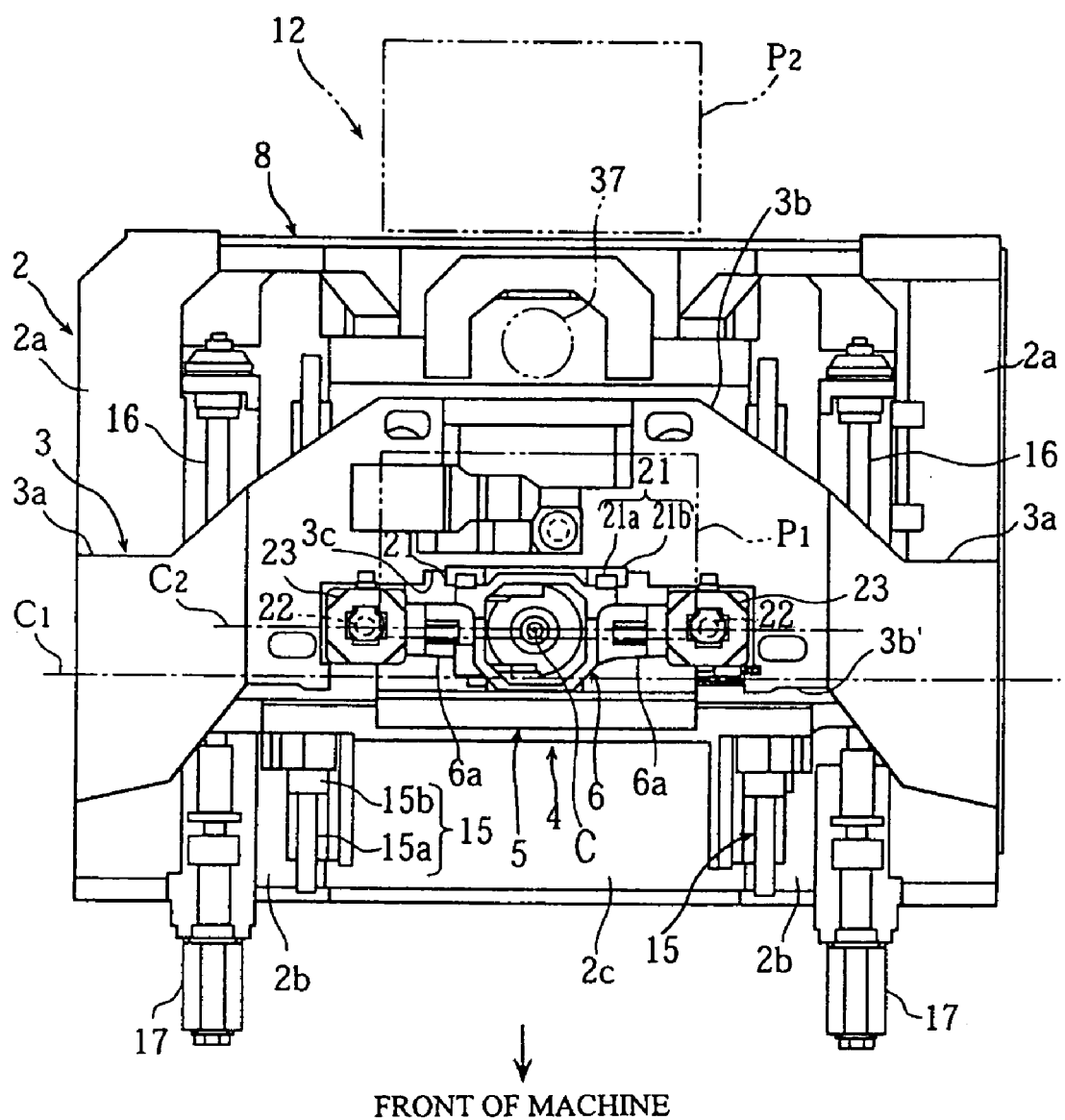
FIG. 3 is a plane view of the vertical machining center.
Figure 4:
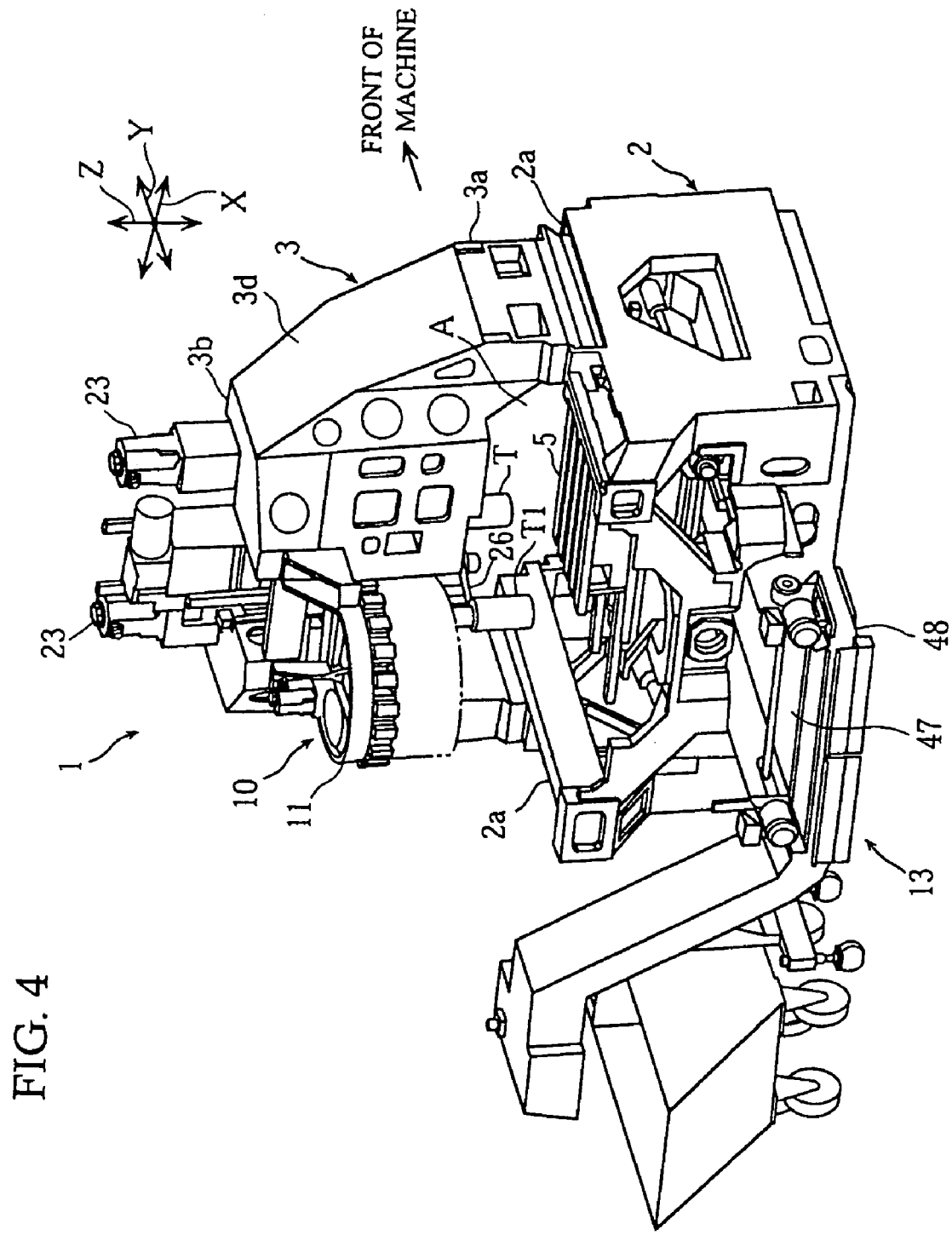
FIG. 4 is a rear perspective view of the vertical machining center.
Figure 5:
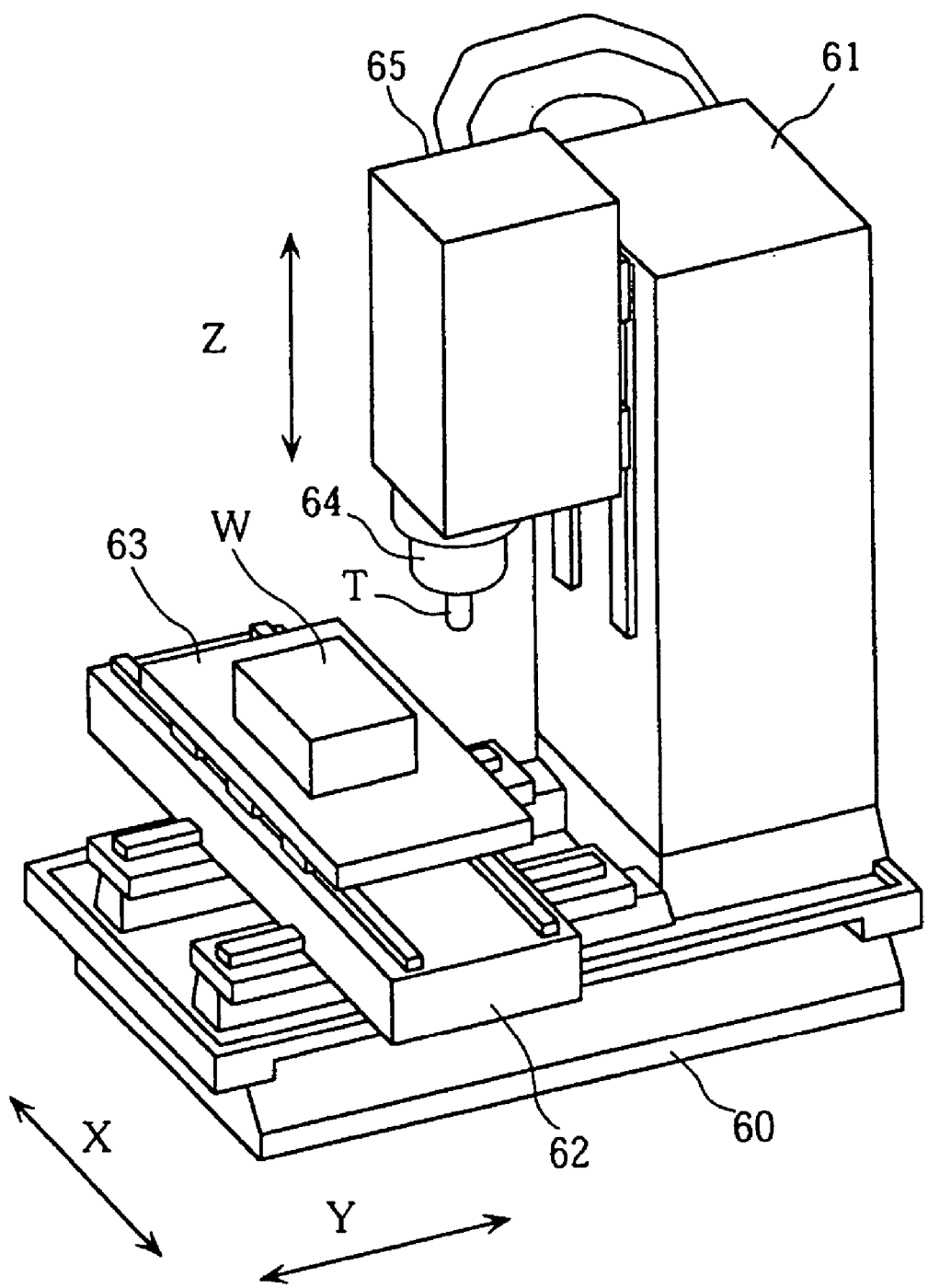
FIG. 5 is a schematic view of a typical vertical machining center according to a conventional art.
Figure 6:
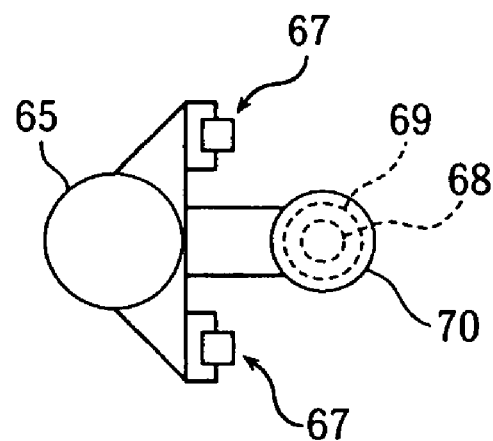
FIG. 6 is a schematic plane view showing a typical driving system according to the conventional art.
Figure 7:
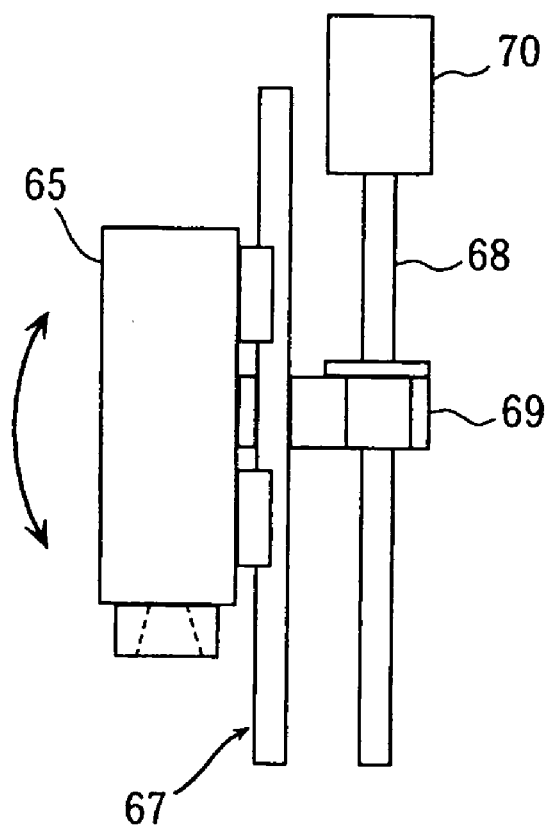
FIG. 7 is a schematic side view showing the conventional driving system.

FIG. 1 to FIG. 4 are views to explain a vertical machining center (machine tool) according to an embodiment of the present invention. FIG. 1 to FIG. 4 are a front view, a right side view, a plane view, and a rear perspective view respectively of the vertical machining center on which a tool changer, a pallet changer, and a chip disposer are mounted.

In the drawings, a vertical machining center 1 includes; a gate-shaped column 3 fixed on a substantially center portion of a fixed bed 2 in terms of a forward and backward direction in a front view of the machine; a saddle 4 disposed under the column 3 to be movable in a Y-axis (forward and backward) direction; a table 5 disposed on the saddle 4 to be movable in an X-axis (right and left) direction; and a spindle head 6 disposed on a front face of the column 3 to be movable in a Z-axis (vertical) direction. A spindle 7 is rotatably supported by a lower end of the spindle head 6 and a tool T is detachably attached to the spindle 7.

In the vertical machining center 1 described above, a workpiece (not shown) placed on the table 5 is cut by the tool T while the workpiece and the spindle 7 are moved relatively to each other, the workpiece moving in the X-axis and Y-axis directions and the spindle 7 moving in the Z-axis direction.

A tool changer 10 for automatically replacing a preceding working tool T attached to the spindle 7 by a subsequent working tool T1 attached to a tool magazine 11 through an opening A under the column 3 by means of a change arm 26 is mounted on a back face side of the column 3.

Under the column 3 on a back face side of the fixed bed 2, mounted is a workpiece changer 12 that automatically replaces via a turn shaft 37 a preceding process pallet P1 on which a machined workpiece is placed by a subsequent process pallet P2 on which a subsequently machined workpiece is placed. Further, a chip disposer 13 is provided on a bottom of the fixed bed 2. The chip disposer 13 includes a conveyor 47 and a coolant tank 48, the conveyor 47 collecting a cutting fluid supplied to a workpiece machining portion and discharging chips produced by workpiece machining out of the machine.

The fixed bed 2 includes right and left vertical walls 2a, 2a, saddle supports 2b, 2b formed in a stepped shape inside the right and left vertical walls 2a, and a substantially flat bottomed recession 2c stepped down from the right and left saddle supports 2b. This bottomed recession 2c is positioned at a center portion of the bed 2 in terms of the X-axis direction with a back face side and an upper face side thereof opened. The right and left vertical walls 2a on the back face side of the fixed bed 2 are coupled to each other with a cross member 8.

Right and left Y-axis guide rails 15 supportingly guiding the saddle 4 in the Y-axis direction extend along inner edges of the right and left saddle supports 2b. Each of the Y-axis guide rails 15 includes a rail 15a fixed to the saddle support 2b and a guide 15b fixed to a bottom face of the saddle 4, the rail 15a and the guide 15b being slidably fitted to each other.

Further, right and left Y-axis ball screws 16, 16 for driving the saddle 4 in the Y-axis direction are rotatably fixed on outer sides of the respective Y-axis guide rails 15 on the right and left saddle supports 2b, and Y-axis drive motors 17, 17 for driving the rotation of the ball screws 16 are connected to front ends of the respective Y-axis ball screws 16.

A pair of front and back X-axis guide rails 18, 18 for supportingly guiding the table 5 in the X-axis direction are disposed on a top face of the saddle 4. Each of the X-axis guide rails 18 includes a rail 18a fixed to the saddle 4 and a guide 18b fixed to a bottom face of the table 5, the rail 18a and the guide 18b being slidably fitted to each other.

Between the front and back X-axis guide rails 18 on the top face of the saddle 4, one X-axis ball screw 19 for driving the movement of the table 5 in the X-axis direction is rotatably fixed, and an X-axis drive motor 20 for driving the rotation of the ball screw 19 is connected to a left end of the X-axis ball screw 19.

A pair of right and left Z-axis guide rails 21, 21 for supportingly guiding the spindle head 6 in the Z-axis direction is disposed on the front face of the column 3. Each of the Z-axis guide rails 21 includes a rail 21a fixed to a back face of the spindle head 6 and a guide 21b fixed to the front face of the column 3, the rail 21a and the guide 21b being slidably fitted to each other.

Right and left Z-axis ball screws 22, 22 for driving the movement of the spindle head 6 in the Z-axis direction is rotatably fixed on outer sides of the respective Z-axis guide rails 21 on the front face of the column 3, and Z-axis drive motors 23, 23 for driving the rotation of the ball screws 22 are connected to upper ends of the respective Z-axis ball screws 22.

The spindle head 6 has arms 6a, 6a extending in the right and left directions, and nuts 22a fitted to the Z-axis ball screws 22 are attached to the right and left arms 6a.

The column 3 is formed integrally by casting and has a shape of a gate that is bridged over an X-axis and Y-axis travel range of the table 5 in a front view of the machine and has right and left legs 3a, 3a and a beam 3b integrally connecting tops of the right and left legs 3a. The right and left legs 3a are fixed on top faces of the right and left vertical walls 2a of the fixed bed 2. In this structure, an opening A which is opened in the Y-axis direction and whose width in the X-axis direction is wide is formed under the column 3.

In a front view of the machine, the right and left legs 3a are inclined so that upper portions 3d of the legs 3a are positioned closer to the spindle head 6 and form a substantially triangular shape with the spindle head 6 side having larger vertical dimension. Further, the beam 3b is formed in a square shape with an upper edge and an open lower edge thereof being substantially parallel to each other.

In a plane view, the column 3 is formed in a substantially arch shape so that the beam 3b is displaced from the right and left legs 3a, 3a toward the back face side of the machine, and a front face 3b' of the beam 3b substantially coincides with a leg center line C1 passing through the centers of the right and left legs 3a in terms of the forward and backward direction. Further, the beam 3b is positioned at a substantially center of the fixed bed 2 in terms of the Y-axis direction, and the right and left legs 3a are positioned at a front side thereof. A housing recession 3c for housing the spindle head 6 and the right and left Z-axis ball screws 22 is formed on the front face 3b' of the beam 3b.

The right and left Z-axis ball screws (spindle drive shafts) 22, 22 are disposed to be symmetrical to each other with respect to a plane that includes an axis C of the spindle head 6 and is parallel to the Y axis, thereby driving the vicinity of the gravity center of the spindle head 6.

The spindle head 6 and the right and left Z-axis ball screws 22, 22 are aligned along a line C2 connecting them, and the connecting line C2 is parallel to the center line C1 of the legs and slightly displaced toward a back face side.

Further, in a side view, an axis of the X-axis ball screw 19 is perpendicular to the axis C of the spindle head 6 at the substantially center of a Y-axis stroke of the table 5. Further, in a front view, an imaginary driving position Y of the Y-axis ball screws 16, 16 is perpendicular to the spindle axis C and substantially matches the gravity center of the saddle 4. With this structure, each driving point of the X axis, Y axis, and Z axis is made closer to a workpiece machining point of the spindle 7.

In this embodiment, the pair of right and left Z-axis ball screws 22, 22 for driving the spindle head 6 are arranged to be symmetrical to each other with respect to the plane that includes the axis C of the spindle head 6 and is parallel to the Y-axis, so that the imaginary driving position of the right and left Z-axis ball screws 22, 22 can substantially match the gravity center of the spindle head 6. This enables the driving of the gravity center of the spindle head 6, so that it is possible to reduce the occurrence of residual vibration that is caused by a bending moment when the spindle head 6 is located. As a result, responsiveness to driving-transmission-output system can be enhanced, which can achieve responsiveness to the recent demand for still higher acceleration/deceleration speed.

In this embodiment, the X-axis ball screw 19 for driving the table 5 is disposed to be perpendicular to the spindle axis C of the spindle head 6, and the imaginary driving position Y of the pair of Y-axis ball screws 16, 16 for driving the saddle 4 is perpendicular to the spindle axis C, so that it is possible to set the imaginary driving position in each of the axis directions to the vicinity of the machining position of the top face of the table 5. This can enhance responsiveness to driving-transmission-output system similarly to the above.

In this embodiment, the column 3 has the shape of the gate bridged over the travel range of the table 5 with the beam 3*b* connecting the tops of the right and left legs 3*a*, 3*a*, and the spindle head 6 and the right and left Z-axis ball screws 22, 22 are disposed on the front face 3*b*' of the beam 3*b* to be aligned along the straight line C2 parallel to the X-axis direction, so that the imaginary driving position of the right and left Z-axis ball screws 22, 22 can match the gravity center of the spindle head 6. This makes it possible to further respond to the demand for higher acceleration/deceleration speed.

The beam 3*b* of the column 3 is displaced from the right and left legs 3*a* toward the back face side of the machine and the spindle axis C of the spindle head 6 coincides with the right and left legs 3*a*, so that the overhang of the spindle head 6 from the column 3 can be eliminated. Accordingly, support stiffness of the spindle head 6 can be increased, which can achieve responsiveness to higher acceleration/deceleration speed.

In this embodiment, the beam 3*b* is positioned at the substantially center portion of the fixed bed 2 in terms of the Y-axis direction, so that it is possible to position the spindle head 6 at the center portion of the fixed bed 2, enabling the expansion of the machinable area.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machine tool comprising:
   a bed;
   a saddle disposed on said bed to be movable in a forward and backward (Y-axis) direction in a front view of the machine tool;
   a table disposed on said saddle to be movable in a right and left (X-axis) direction;
   a column fixed on said bed;
   a spindle head disposed on a front face of said column to support a spindle and movable in a vertical (Z-axis) direction;
   a pair of right and left spindle drive shafts, for moving said spindle head, disposed on a front face of said column to be substantially symmetrical to each other with respect to a plane that includes an axis of said spindle head and is parallel to the Y-axis, thereby driving a vicinity of a gravity center of said spindle head.

2. The machine tool according to claim 1,
   wherein said column has a shape of a gate that is bridged over a travel range of said table and has right and left legs and a beam connecting tops of the right and left legs, and
   wherein a straight line connecting the axis of said spindle head and axes of said right and left spindle drive shafts is parallel to the X axis in a plane view.

3. The machine tool according to claim 2,
   wherein the beam of said column is displaced from the right and left legs toward a back face side of the machine tool, and the axis of said spindle head coincides with the legs in a side view of the machine tool.

4. The machine tool according to claim 2,
   wherein the beam is positioned at a substantially center portion of said bed in terms of the Y-axis direction.

5. The machine tool according to claim 3, wherein the beam is positioned at a substantially center portion of said bed in terms of the Y-axis direction.

* * * * *